United States Patent [19]
Wood

[11] Patent Number: 4,738,316
[45] Date of Patent: Apr. 19, 1988

[54] ADJUSTABLE SHANK MOUNTING FOR AN EARTHWORKING TOOL

[75] Inventor: William R. Wood, Ames, Iowa

[73] Assignee: Deere & Company, Moline, Ill.

[21] Appl. No.: 896,032

[22] Filed: Aug. 11, 1986

[51] Int. Cl.⁴ .............................................. A01B 15/16
[52] U.S. Cl. ................... 172/603; 74/89.15; 172/742; 172/744; 172/763; 403/61; 403/108
[58] Field of Search ............ 172/574, 602, 603, 741, 172/742, 744, 762, 763; 403/4, 59, 61, 98, 108, 116, 88, 92, 93, 96, 165; 74/89.15

[56] References Cited
U.S. PATENT DOCUMENTS
1,094,068 4/1914 Haas ..................................... 172/603
3,575,378 4/1971 Fawkes ......................... 74/89.15 X FOREIGN PATENT DOCUMENTS
141272 5/1951 Australia .............................. 403/108
1334083 6/1963 France ................................. 403/108

Primary Examiner—Richard T. Stouffer

[57] ABSTRACT

A shank mounting arrangement for a disk hiller or similar implement which provides simple and precise angular adjustment of the shank independently of vertical adjustment. An upright slotted tube is fixed to a support beam and an upright apertured shank is slidably received in the tube. An adjustable collar including a plurality of holes adapted for alignment with the slots in the upright tube is mounted for rotation with respect to the upright tube, and a pin is inserted through the holes, slot and an aperture in the shank for retaining the shank in a preselected one of a plurality of vertical positions relative to the support beam. The collar may be rotated independently of vertical adjustment to change the angle of the shank.

10 Claims, 2 Drawing Sheets

ADJUSTABLE SHANK MOUNTING FOR AN EARTHWORKING TOOL

BACKGROUND OF THE INVENTION

The present invention relates generally to agricultural equipment, and more specifically, to an adjustable mounting arrangement for the shank of an earthworking tool such as a disk hiller.

Numerous agricultural implements utilize earthworking tools mounted at the lower ends of shanks which in turn are adjustably connected to a transverse beam by mountings which permit both vertical and angular adjustment of the shank to change the relative position of the earthworking tool. For example, disk hillers are used on row crop cultivators for cutting through residue and cultivating next to the row. They include a pair of concave disks that operate at an angle relative to the crop being cultivated. The disk angle, depth and distance from the row must be adjustable for precisely locating the disk. Presently available devices for making such adjustments require loosening of bolts, and typically when the bolts are loose both the depth and angular adjustments can change. Therefore it is difficult to make one adjustment without changing the other.

OBJECTS OF THE INVENTION

It is therefore an object of the present invention to provide an improved shank mounting arrangement for an agricultural implement. It is a further object to provide such an arrangement which permits independent angular and vertical adjustments quickly and easily.

It is a further object of the present invention to provide a shank mounting arrangement wherein vertical adjustment of the shank can be made quickly and reliably by simply removing and inserting a pin, and angular adjustment can be made independently of the vertical adjustment. It is a further object of the invention to provide such an arrangement wherein the angular adjustment can be made precisely and easily.

BRIEF DESCRIPTION OF THE INVENTION

In accordance with the above objects, an adjustable mounting arrangement is provided having a main transversely extending support member which is adjustably mounted on an implement such as a cultivator. An upright tube is fixed to one of the upright faces of the support member and includes a plurality of slots spaced one above the other. An upright shank having an apertured upper portion is slidably received within the tube and includes a lower end adapted for receiving an earthworking tool such as a disk hiller. An adjusting collar is rotatably mounted over the upright tube and includes a plurality of vertically spaced holes adapted for alignment with the slots in the tube and with at least one of the apertures in the upper portion of the shank. A pin is inserted through the hole, slot and aperture for retaining the shank in a preselected vertical position relative to the support member. The slots in the upright tube permit the adjusting collar and shank to be rotated with respect to the tube. The collar includes a retainer fork extending over the beam and supporting a threaded block. A bolt is threaded through the block and rotatably supported on the transversely extending support member. The bolt may be rotated to thereby rotate the collar and the shank to precisely adjust the angular relationship of the earthworking tool with respect to the crop being cultivated. Vertical adjustment is achieved quickly and easily and is reliably maintained, independently of the angular adjustment, by simply removing the pin and aligning the shank aperture with a different one of the slots in the upright tube. Therefore vertical adjustment can be made without tools and angular adjustment is precise and easily performed with a wrench.

These and other objects, features and advantages of the present invention will become apparent to one skilled in the art upon reading the following detailed description in view of the drawings.

DESCRIPTION OF THE PREFERRED EMBODIMENT

Figure 1:
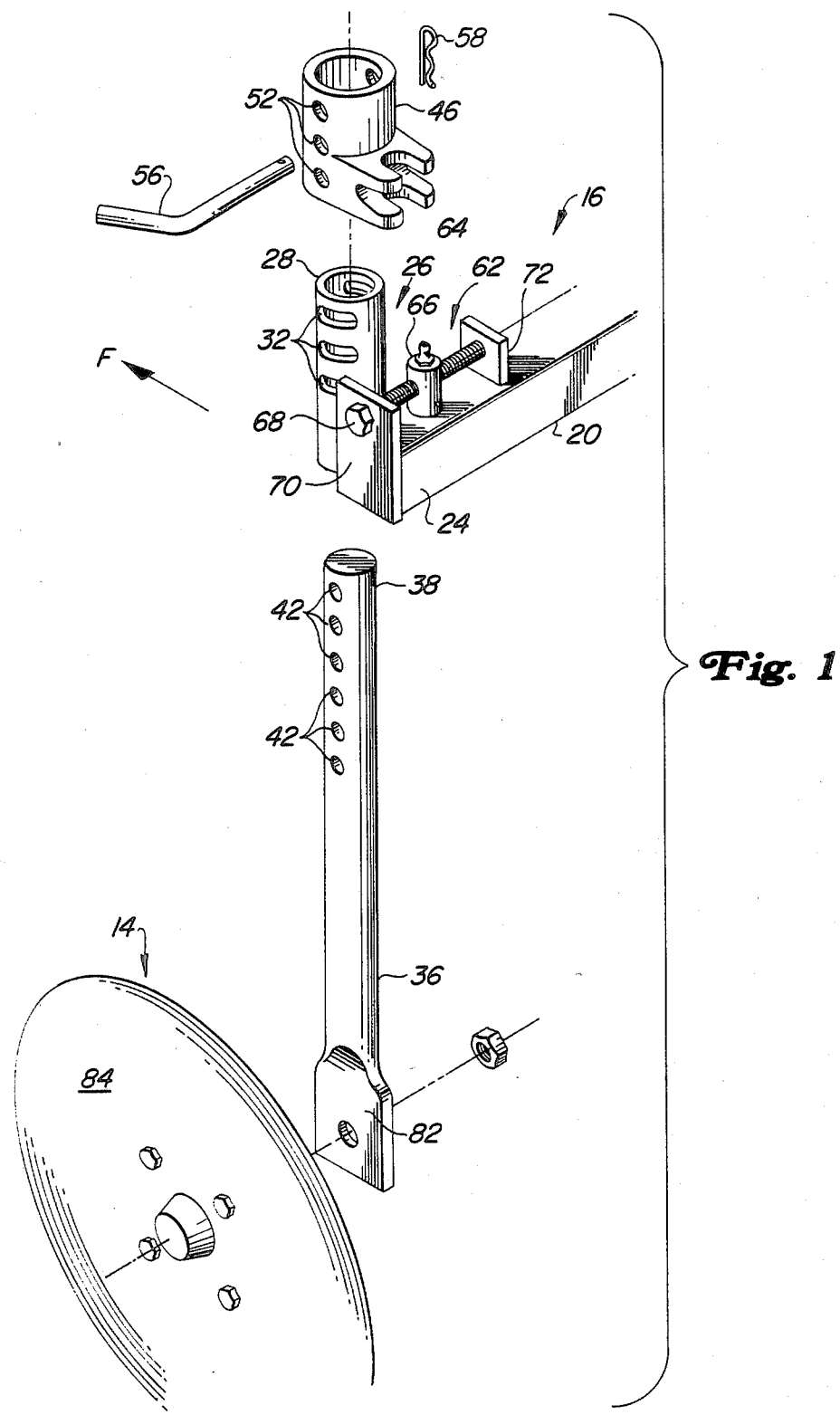
FIG. 1 is an exploded view of a portion of a cultivating implement utilizing the shank mounting arrangement of the present invention.
Figure 3:
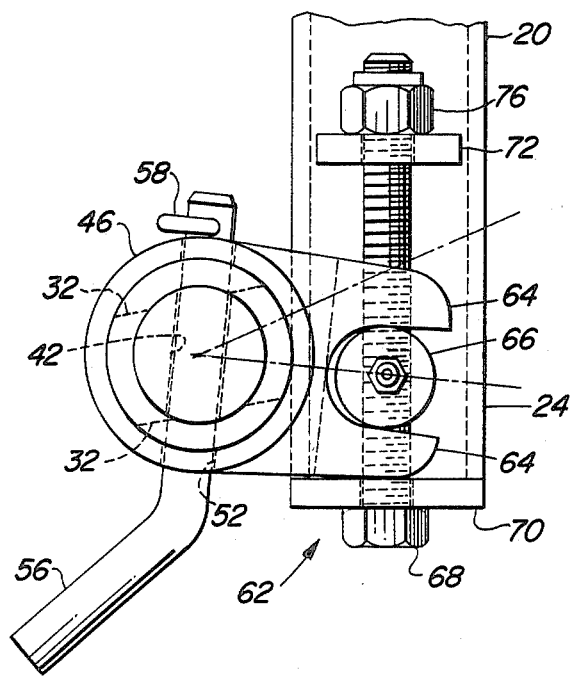
FIG. 3 is an enlarged top view of the mounting arrangement.
Figure 2:
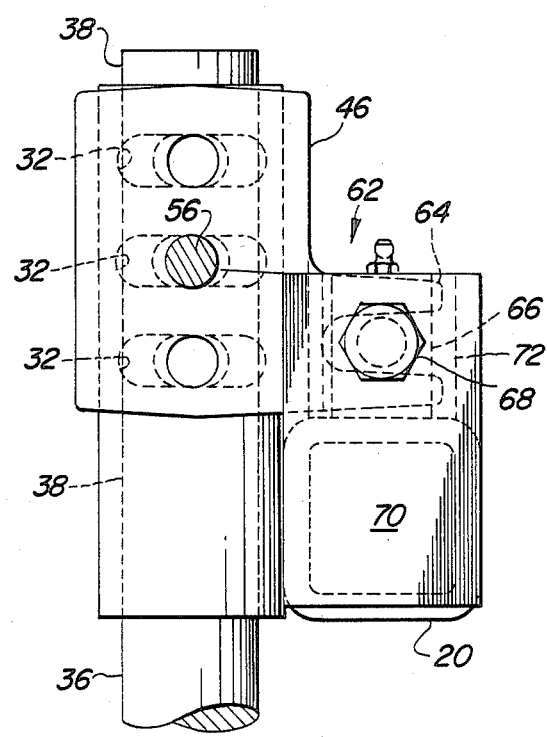
FIG. 2 is an enlarged side view of the shank mounting arrangement of the present invention.

Referring now to FIG. 1, there is shown a portion of a cultivating implement adapted for forward movement F over a field of crops planted in parallel rows and including earthworking tools 14 adapted for engaging the soil next to a row of crops. In the embodiment shown, the tools 14 comprise concave disks that operate at an angle relative to the crop being cultivated and are commonly referred to as disk hillers. The tools 14 are connected by a shank mounting assembly indicated generally at 16.

The shank mounting assembly 16 includes a square cross tube 20 mounted for a transverse adjustment in notches on the cultivator rig frame (not shown). The tube 20 extends transversely from the rig frame to an end 24 which supports the tool 14. The mounting assembly 16 includes an adjustable shank mount indicated generally at 26. The shank mount 26 includes an upright cylindrical tube 28 welded to a one of the vertical faces of the beam 20 and having an upper end extending upwardly from the top face of the beam 20. The sides of the tube 28 include a plurality of parallel, generally horizontal and vertically spaced slots 32.

An upright shank 36 includes a rounded upper portion 38 received within the cylindrical tube 28 and having a plurality of apertures 42, one of which is selectively positionable adjacent one set of the parallel slots 32. An adjusting collar 46 is rotatably mounted over the outside of the upright cylindrical tube 28 and includes vertically spaced holes 52 at each side thereof adapted for alignment with corresponding parallel slots 32. The shank 36 is inserted through the tube 28, and one of the apertures 42 is aligned with a selected set of the slots 32 and with a corresponding set of the holes 52. Thereafter, a pin 56 is inserted through the selected holes 52 and slots 32 and through the aperture 42 in the shank 36 to vertically fix the shank 36 with respect to the cross tube 20. A cotter pin 58 is inserted through the end of the pin 56 to prevent the pin from falling out of the collar 46. The slots 32 permit the shank 36, adjusting collar 46 and pin 56 to be rotated angularly with respect to the upright cylindrical tube 28.

To angularly fix the shank 36 in a preselected location, angle adjusting structure 62 is provided and includes a retaining fork 64 extending radially outwardly from the adjusting collar 46 adjacent the lower end thereof for projecting over the top face of the beam 20. The ends of the adjusting fork 64 are bifurcated and receive a cylindrically shaped threaded block 66. An elongated bolt 68 is received between the upper and lower pairs of bifurcated ends of the retaining fork 64 and is threaded through the block 66. The bolt 68 is rotatably supported on the beam 20 by transversely spaced clips 70 and 72 welded to the end and upper face of the beam 20. As the bolt 68 is rotated, the threaded block 66 moves linearly along the bolt as the retaining fork 64 prevents rotation of the block 66. The bifurcated ends of the fork 64 are sufficiently elongated to provide substantial angular adjustment of the collar 46 while maintaining good retention of the threaded block 66 therein. The bolt and threaded block arrangement provides precise and infinitely variable angular adjustment of the shank 36 as the slots 32 permit rotation of the collar 46 and the shank 36 with respect to the upright cylindrical tube 28. A lock nut 76 is threaded onto the end of the bolt 68 to retain the bolt within the apertures on the clips 70 and 72. The lock nut 76 may also be tightened sufficiently against the clip 72 to prevent unwanted rotation of the bolt 68.

The lower end of the shank 36 is flattened and apertured at 82 and receives the axle of a conventional disk hiller blade 84. Although the present invention is shown utilized with a disk hiller attachment, it is to be understood that the present invention may also be utilized with other types of shank mounted tool assemblies.

To adjust the shank 36 vertically, the pin 56 is removed from the adjusting collar 46 and tube 32. The aperture 42 in the upper end of the shank is then aligned with a different set of the holes 52 in the collar 46 and the corresponding set of parallel slots 32 in the cylindrical tube 28. The pin 56 then is reinserted through the new set of holes 52, slots 32 and selected aperture 42. For a larger range of vertical adjustments, and for more precise vertical adjustment of the shank 36, a plurality of apertures 42 are provided so that a different aperture 42 may be selected for alignment with a given pair of the slots 32 and corresponding holes 52. As is evident from the above description, the vertical adjustment of the shank 36 is made independently of the angular adjustment provided by the adjusting structure 62. To adjust the angular position of the shank 36, the operator simply rotates the bolt 68 to thereby cause the threaded member 66 to rotate the adjusting collar 46 and therefore the shank 36 with respect to the fixed cylindrical tube 28.

The diameter of the holes 52 in the collar 46 and the apertures 42 in the shank 36 are approximately equal to but slightly larger than the diameter of the pin 56, and the width of the slots 32 is approximately equal to the diameter of the holes 52 and apertures 42. The diameter of the upper end 38 of the shank 36 is approximately equal to but slightly smaller than the diameter of the hole through the cylindrical tube 28. The inner diameter of the adjusting collar 46 is approximately equal to but slightly larger than the outer diameter of the tube 28 to provide a secure fit of the shank 36 to the beam 20 while permitting relatively easy vertical and angular adjustments of the shank 36.

Having described the preferred embodiment, it will be apparent that modifications can be made without departing from the scope of the invention as defined in the accompanying claims.

I claim:

1. An adjustable mounting for an earthworking tool, said mounting comprising:
   a support member;
   an upright tube fixed to the support member and including at least one slot;
   an upright shank having an apertured upper portion slidably received within the tube and a lower end adapted for receiving the tool thereon;
   an adjusting collar rotatably mounted over the upright tube and including a hole adapted for alignment with the tube slot and shank aperture;
   pin means insertable through the hole slot and aperture for constraining the shank and collar for rotation together relative to the tube and retaining the shank in a preselected vertical position relative to the support member; and
   angle adjusting means for rotating the adjusting collar and pin means relative to the tube to thereby rotate the shank within the tube, said slot permitting rotation of the pin means with the shank and adjusting collar while maintaining the shank in said preselected vertical position.

2. The invention as set forth in claim 1 wherein the angle adjusting means comprises a threaded member supported by the adjusting collar, a bolt threaded into the threaded member, and means rotatably mounting the bolt on the support member for moving the threaded member along the bolt as the bolt is rotated.

3. The invention as set forth in claim 1 wherein the at least one slot of the upright tube includes a plurality of parallel, vertically spaced slots, wherein said pin means is selectively insertable into one of the slots for effecting vertical adjustment of the upright shank.

4. The invention as set forth in claim 3 wherein the adjusting collar includes a plurality of vertically spaced holes equal in number to the plurality of slots for aligning with said plurality of spaced slots for effecting vertical adjustment of the shank without vertical movement of the collar.

5. The invention as set forth in claim 3 wherein the apertured portion of the shank includes a plurality of selectable apertures for receiving the pin means.

6. The invention as set forth in claim 1 wherein the support member comprises a transverse beam adapted for movement in the forward direction, the beam including upright faces, and means connecting the upright tube to one of the faces, said tube including an upper portion extending above the beam, wherein the collar extends around the upper portion of the beam and wherein the angle adjusting means includes a retainer fork projecting from the collar over the beam, a block retained by the fork, and a threaded elongated member rotatably supported on the beam and threaded into the block.

7. The invention as set forth in claim 1 wherein the upright shank comprises a disk hiller shank and the angle adjusting means comprises a threaded member providing infinitely variable angular adjustment of the shank.

8. An adjustable mounting for an earthworking tool, said mounting comprising:
   a support member comprising a transverse beam adapted for movement in the forward direction, the beam including upright faces;
   an upright tube fixed to the support member and including at least one slot;

an upright shank having an apertured upper portion slidably received within the tube and a lower end adapted for receiving the tool thereon;

an adjusting collar rotatably mounted over the upright tube and including a hole adapted for alignment with the tube slot and shank aperture;

pin means insertable through the hole, slot and aperture for retaining the shank in a preselected vertical position relative to the support member; and angle adjusting means for rotating the adjusting collar relative to the tube to thereby rotate the shank within the tube, said slot permitting rotation of the pin means with the shank and adjusting collar while maintaining the shank in said preselected vertical position, wherein the angle adjusting means includes a retainer fork projecting from the collar over the beam, a block retained by the fork, and a threaded elongated member rotatably supported on the beam and threaded into the block.

9. The invention as set forth in claim 8 wherein the upright shank comprises a disk hiller shank and the threaded member of the angle adjusting means provides infinitely variable angular adjustment of the shank.

10. An adjustable mounting for an earthworking tool, said mounting comprising:

a support member;

an upright tube fixed to the support member and including at least one slot;

an upright shank having an apertured upper portion slidably received within the tube and a lower end adapted for receiving the tool thereon;

an adjusting collar rotatably mounted over the upright tube and including a hole adapted for alignment with the tube slot and shank aperture;

pin means insertable through the hole, slot and aperture for retaining the shank in a preselected vertical position relative to the support member; and angle adjusting means for rotating the adjusting collar relative to the tube to thereby rotate the shank within the tube, said slot permitting rotation of the pin means with the shank and adjusting collar while maintaining the shank in said preselected vertical position, wherein the angle adjusting means comprises a threaded member supported by the adjusting collar, a bolt threaded into the threaded member, and means rotatably mounting the bolt on the support member for moving the threaded member along the bolt as the bolt is rotated.

* * * * *